United States Patent [19]

Tschudin-Mahrer

[11] Patent Number: 5,064,709
[45] Date of Patent: Nov. 12, 1991

[54] COMPOSITE PART OF FLEXIBLE CELLULAR MATERIAL AND ELASTIC RUBBER MATERIAL

[75] Inventor: Rolf Tschudin-Mahrer, Lausen, Switzerland

[73] Assignee: Irbit Research & Consulting AG, Fribourg, Switzerland

[21] Appl. No.: 350,553

[22] PCT Filed: Sep. 9, 1988

[86] PCT No.: PCT/EP88/00818
§ 371 Date: May 5, 1989
§ 102(e) Date: May 5, 1989

[87] PCT Pub. No.: WO89/02364
PCT Pub. Date: Mar. 23, 1989

[30] Foreign Application Priority Data

Sep. 11, 1987 [DE] Fed. Rep. of Germany ....... 3730573

[51] Int. Cl.⁵ ........................... B32B 3/02; B32B 3/26

[52] U.S. Cl. .................... 428/157; 156/308.2; 156/309.9; 264/321; 428/159; 428/170; 428/192; 428/314.2; 428/319.3

[58] Field of Search ............... 428/157, 159, 160, 170, 428/192, 314.2, 319.3; 264/321; 156/308.2, 309.9

[56] References Cited

U.S. PATENT DOCUMENTS

| | | | |
|---|---|---|---|
| 4,247,513 | 1/1981 | Liu | 264/249 |
| 4,524,096 | 6/1985 | Schiedegger | 428/157 |
| 4,533,577 | 8/1985 | Mier | 428/157 |

Primary Examiner—William J. Van Balen
Attorney, Agent, or Firm—Martin A. Farber

[57] ABSTRACT

A composite part of flexible cellular material and elastic, rubber material, wherein the cellular material is a cellular synthetic material and is compressed with the rubber material under cellular synthetic material hot-stamping conditions, the cellular material being condensed in the region of attachment.

12 Claims, 1 Drawing Sheet

COMPOSITE PART OF FLEXIBLE CELLULAR MATERIAL AND ELASTIC RUBBER MATERIAL

FIELD AND BACKGROUND OF THE INVENTION

The present invention relates to a composite part of flexible cellular material and elastic, unvulcanized rubber material.

It is known to bond, weld, clip open-cell foam material to a rubber-like rubber material. These methods are, however, relatively expensive from the standpoint of manufacturing technique and also are not always satisfactory in use.

It is the object of the present invention therefore to provide a composite part of flexible cellular material and elastic rubber material which is simple to manufacture and advantageous in use.

SUMMARY OF THE INVENTION

This object is achieved by a composite part wherein the cellular material is a cellular synthetic material (3) and is compressed with the rubber material (2) under cellular synthetic material hot-stamping conditions, the cellular synthetic material being compacted in the region of attachment.

Rubber material with elastic properties is ordinarily vulcanized at about 160° C. to 180° C., for a period of time of from two to three minutes. On the other hand, a molded part of cellular material is produced by the so-called hot-stamping method at a temperature of about 230° C. and for a period of time of about one and a half minutes. Therefore, up to now it has been assumed that it is not possible to effect hot stamping of the foam material simultaneously with a vulcanizing of the rubber material. Surprisingly it has, however, been found that the rubber material vulcanizes satisfactorily even upon brief action of higher temperatures and, if a compressing with cellular material is effected simultaneously, an advantageous bond is formed between the cellular material and the rubber material, with simultaneous compacting of the cellular material in the region of the attachment.

It is particularly advantageous to employ, in the case of a composite part according to the invention, a rubber material which is resistant to high temperatures. For example, so-called CR or NBR rubbers offer themselves for this purpose. In addition to this, silicone rubber, for instance, can also be used to advantage.

The foam material is preferably compacted or covered by a skin on at least one side.

Composite parts of the type in question can, for instance, be used in automobile engineering, in which connection the region consisting here of rubber material can assume sealing functions, for instance in the region of a lamp mount or an oil-drain opening, while the cellular material carries out substantially damping functions. Due to the fact that the foam part is preferably compacted or even covered by a skin, there results in this connection in addition, however, an advantageous seal also with respect to the part of cellular material, which seal is at least substantially water-repellent.

Surprisingly it has also been found that even in the case of foam material covered by a skin, the composite part of the invention has, due to the compacting under hot-stamping conditions, still sufficient adherence between the cellular material and the rubber material.

With respect to the rubber material, it may also, in another advantageous embodiment, be provided with a cell-like structure. For example, this is achieved in the manner that an expansion agent is added to the rubber material. With a slight weight of the composite part, there is obtained a seal which is excellent also in the region of the rubber material.

With respect to the structural development of the composite part, it is first of all possible for the rubber material and the cellular material to adjoin each other with butt surfaces or at least obliquely. In a preferred development, it is provided that the cellular material overlap the rubber material, at least in part. It has also been found that with respect to the said fields of use for the composite part, the cellular material can completely surround the rubber material on one side. By the pressing process with the parameters indicated further above, it then results that the cellular material is highly compressed in the region of the overlap and has a structure which corresponds approximately to that of the flexible rubber material.

The invention also has the object of providing a method of manufacturing a composite part of flexible cellular material and an elastic rubber material, in particular a composite part such as described previously.

It is essential that the foam material and the elastic part of rubber material be introduced into a pre-heated mold and compacted jointly under hot-stamping conditions of the cellular material. The cellular material and the elastic part itself can be introduced into the mold at room temperature.

It is of importance that pieces which have already been pre-contoured and which therefore correspond already essentially to the final shape of the composite part be introduced into the mold. This means that the work in the mold to be performed with respect to the final shape of the composite part is relatively slight and the mold can therefore be operated with comparatively low pressures. The method of the invention also has the particular advantage that the final molded parts can be removed again from the mold in hot condition.

In detail, the compacting is carried out for a period of time of one to two minutes, preferably one and a half minutes, and at a temperature of 200° C to 250° C., preferably 230° C. In this connection, the mold is acted on by a pressure of 2 to 5 bar, preferably 3 bar.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Composite parts 1 consisting of regions 2 and 3 are shown and described. The region 2 is a vulcanized rubber material while the region 3 consists of flexible open-cell foam material.

The regions 2 and 3 are placed as unvulcanized rubber material, and respectively, as cellular material semifinished plate into a pre-heated hot mold and pressed together, in the case of hot stamping conditions, for instance of PUR foam, i.e. at about 230° C. and with a time of action of about one and a half minutes.

Figure 1:
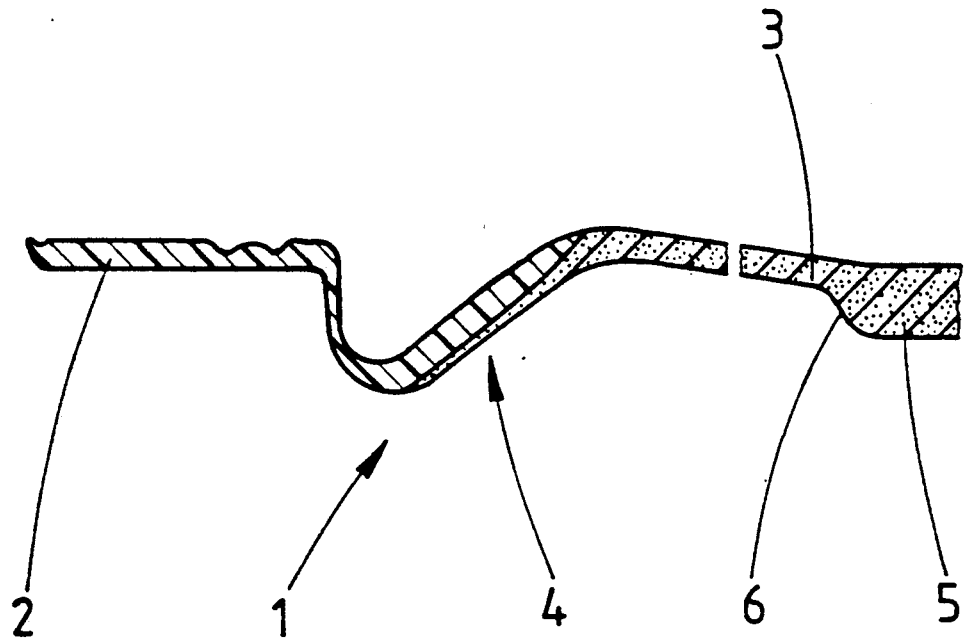
FIG. 1 is a cross-section through a first embodiment of a composite part in accordance with the invention.

In the embodiment shown in FIG. 1, the region 2 which serves as a sealing lip is overlapped in part by the region 3, i.e. by the flexible cellular material, within the overlap region 4. Within the overlap region 4, the open-cell foam material is so strongly compacted that it is practically completely collapsed. By the stamping, furthermore, there is obtained the structured form of the composite part as a whole, shown in FIG. 1, with grooves formed in the sealinglip region of the rubber material and a region 5 of larger diameter of substantially uncompacted cellular material, in order to obtain good damping properties.

Figure 2:
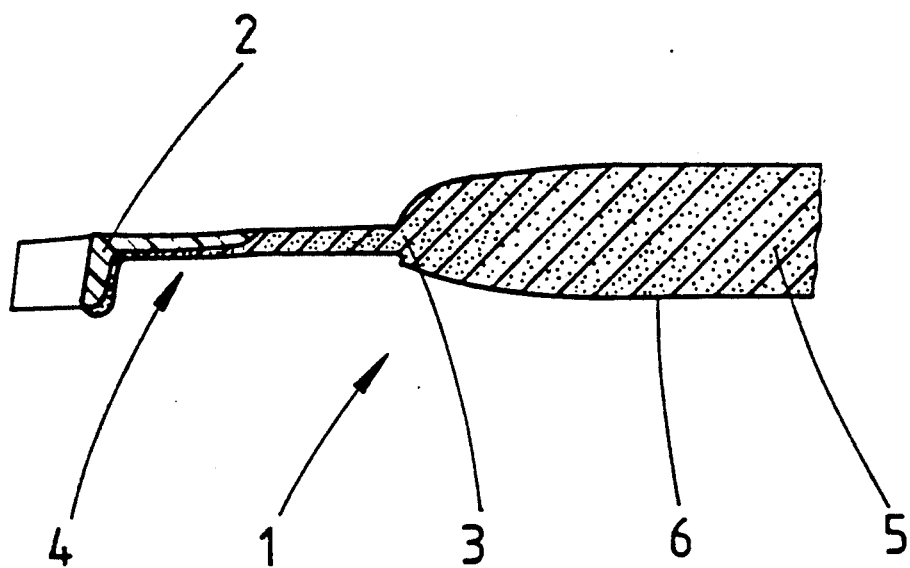
FIG. 2 is a cross-section through a second embodiment of a composite part in accordance with the invention.

In the embodiment shown in FIG. 2, the region 3 overlaps the region 2 over practically its entire length within the overlap region 4. Depending on the shape of the mold, in this way advantageously less compacted cellular material regions are formed in the region of the sealing lip and the region facing away from the sealing surface (not shown), said regions assuring, for instance, an elastic but dependable application of the sealing surface. Furthermore, also in the case of the embodiment in accordance with FIG. 2, a structuring of the molded part 1 is present, a substantially uncompacted cellular material being present in the region 5.

Furthermore, in both embodiments the composite part 1 is provided with a skin 6 in the region of the foam 3.

I claim:

1. A composite part of flexible cellular material and elastic, unvulcanized rubber material, wherein
   the cellular material is a cellular synthetic material and is compressed with the rubber material under cellular synthetic material hot-stamping conditions to form an attachment therewith, and wherein the cellular synthetic material is compacted in a region of the attachment.

2. A composite part according to claim 1, wherein the rubber material has a high temperature resistance.

3. A composite part according to claim 1, wherein said cellular synthetic material is precompacted.

4. A composite part according to claim 1, wherein the cellular synthetic material has a skin over it.

5. A composite part according to claim 1, wherein the rubber material has a cell-like structure.

6. A composite part according to claim 1, wherein the cellular synthetic material at least partially overlaps the rubber material.

7. A composite part according to claim 1, wherein the cellular synthetic material completely surrounds the rubber material on one side.

8. A method of producing a composite part of flexible cellular material and an elastic part having a base of unvulcanized rubber material, comprising the steps of
   introducing a cellular synthetic material and the elastic part having the rubber material into a pre-heated mold, and
   compressing the cellular synthetic material and the elastic part having the rubber material together under hot-stamping conditions of the cellular synthetic material so as to produce an attachment of the cellular synthetic material and the elastic part having the rubber material with the cellular synthetic material being compacted in the region of the attachment.

9. A method according to claim 8, wherein
   the step of compressing is effected for a period of time of from one to two minutes at a temperature of 200° C. to 250° C. and at a pressure of 2 to 5 bar.

10. A method according to claim 9, wherein the period of time is 1.5 minutes.

11. A method according to claim 9, wherein the temperature is 230° C.

12. A method according to claim 9, wherein the pressure is 3 bar.

* * * * *